Jan. 5, 1926.  
V. C. PARKER  
1,568,615  
OVERHEAD CAM SHAFT AND VALVE GEAR  
Filed Feb. 19, 1920  2 Sheets-Sheet 1
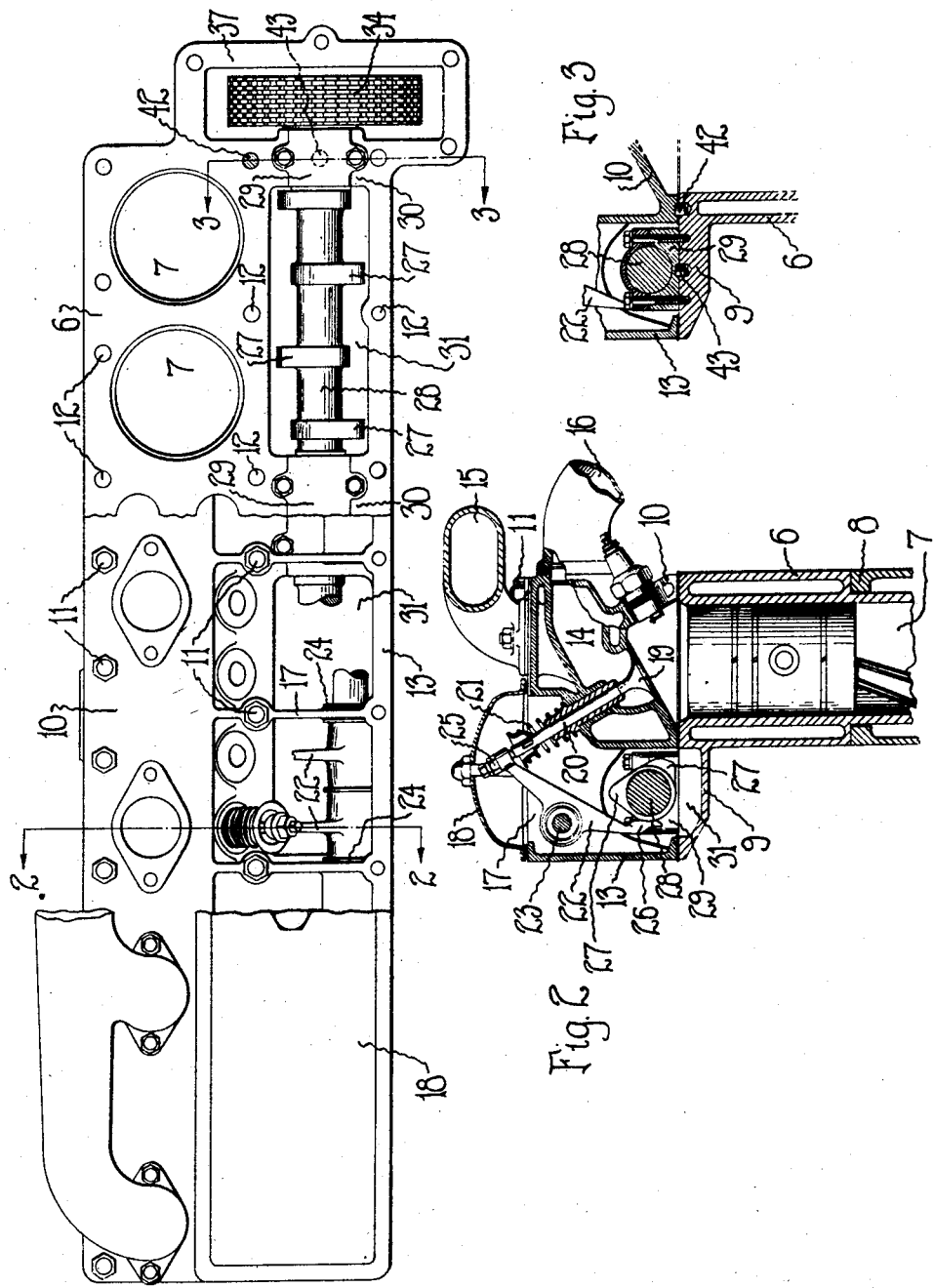
Inventor  
VICTOR C. PARKER  
By Attorneys  
Blackmore, Spencer & Flint

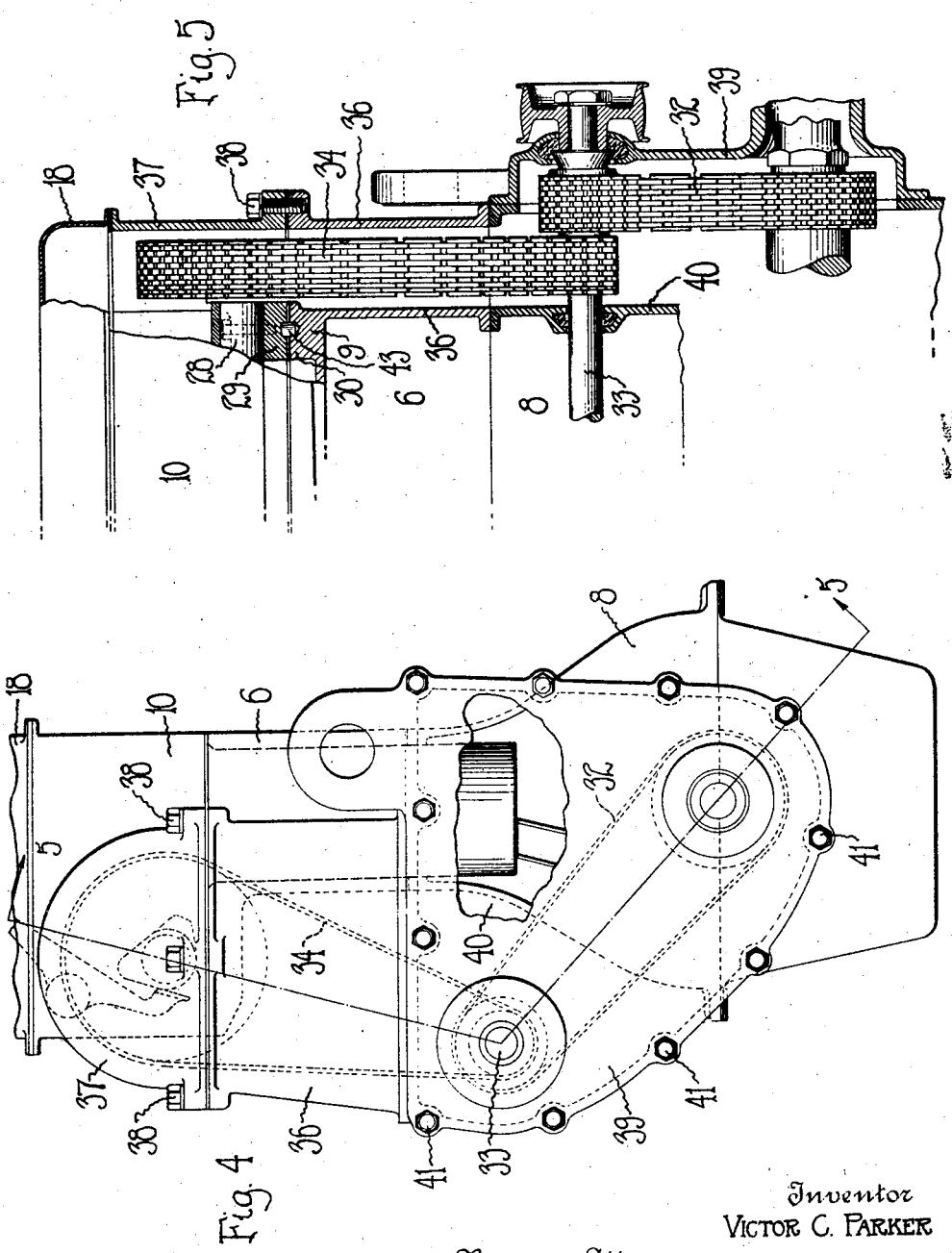

Patented Jan. 5, 1926.

1,568,615

UNITED STATES PATENT OFFICE.

VICTOR C. PARKER, OF WATERLOO, IOWA, ASSIGNOR TO GENERAL MOTORS CORPORATION, OF DETROIT, MICHIGAN, A CORPORATION OF DELAWARE.

OVERHEAD CAM SHAFT AND VALVE GEAR.

Application filed February 19, 1920. Serial No. 359,925.

*To all whom it may concern:*

Be it known that I, VICTOR C. PARKER, a citizen of the United States, and a resident of Waterloo, county of Black Hawk, and State of Iowa, have invented certain new and useful Improvements in Overhead Cam Shafts and Valve Gears, of which the following is a full, clear, concise, and exact description, such as will enable others skilled in the art to which the invention relates to make and use the same, reference being made therein to the accompanying drawings, which form a part of this specification.

My invention relates to internal combustion engines, and particularly to valve operating mechanism associated with and forming a part of such engines and designed to operate the valves which control the supply of combustible mixture to and the flow of burned gases from the cylinder of the engine; the invention being illustrated in the accompanying drawings and described in the following specification as applied to an internal combustion engine of the multiple cylinder type, altho my invention is equally capable of use in connection with engines having a single cylinder only, or a different number of cylinders than the number present in the embodiment of my invention herein disclosed.

The principal object of my invention is to provide improved valve operating mechanism for internal combustion engines in which the number of parts employed is materially less than has heretofore ordinarily been the case, thus simplifying the valve mechanism and increasing the reliability thereof when in use.

A further object of my invention is to provide valve operating mechanism wherein the principal parts thereof are located adjacent the head of the engine with which the mechanism is used, and in which the levers whereby the valves are operated are in fact located within the head structure and are removable therewith if and when the head of the engine is removed for any purpose.

A further object of my invention is to provide valve operating mechanism in which the valve operating levers and the valves which they operate are permanently assembled with the head of the engine, and in which the valve operating cam shaft is enclosed by but is separated from said head; and which two devices may be readily removed as unitary constructions or mechanisms from the engine, and readily replaced without disturbing the proper operative relationship of the various elements of the valve mechanism relative to one another; thus providing valve operating mechanism which may be readily assembled with and disassembled from the engine without disturbing the relation of the various parts thereof or changing their proper adjustment by such disassembling and reassembling of the mechanism in question.

A further object of my invention is to provide valve operating mechanism for internal combustion engines of the type wherein the entire mechanism is enclosed within a closed casing or chamber which, however, may be readily opened for the purpose of inspection and adjustment of the said mechanism, and in which the parts which may have to be adjusted are so located that they are readily accessible if and when adjustment has to be made.

A further object of my invention is to provide valve operating mechanism of the type referred to and so constructed and arranged that the principal parts thereof may be made to operate in a bath of oil, thus providing for an effective lubrication of the principal wearing elements of the mechanism.

With the above and other objects of invention in view, my invention consists in the improved valve operating mechanism for internal combustion engines illustrated in the accompanying drawings and hereinafter described and claimed; and in such variations and modifications thereof, within the scope of the concluding claims, as will be obvious to those skilled in the art to which my invention relates.

Referring now to the drawings wherein the preferred embodiment of my invention is illustrated:

Figure 1 is a plan view showing an internal combustion engine equipped with my improved valve operating mechanism; the head of the engine being shown in place upon the cylinder block thereof in the left-hand part of the figure but removed at the right-hand end thereof.

Figure 2 is a view showing a section upon a transverse vertical plane through any one of the six cylinders of the engine illustrated, as indicated by the line 2, 2, Figure 1.

Figure 3 is a fragmentary view showing a section upon a transverse plane indicated by the lines 3, 3, Figure 1.

Figure 4 is a view showing the engine illustrated in Figures 1 and 2 in end elevation for the most part, and as seen from a position to the right of Figure 1.

Figure 5 is a fragmentary view showing a section taken upon planes indicated by the line 5, 5, Figure 4, and extending longitudinally of the engine.

Referring now to the drawings:

The reference numeral 6 designates a cylinder block having six cylinders designated by the reference numeral 7 in the embodiment of my invention illustrated, but the number of which cylinders may obviously be varied to suit the choice of the designer in each particular case. The cylinders 7 are open at their upper ends and the cylinder block as a whole is supported by a case 8 which forms the upper half of the crank case of the engine in the form of my invention illustrated. I wish here to remark, however, that the particular form, construction, and arrangement of the cylinders, the crank case, and other structural features of the engine are in no way involved in this present invention, and may be varied in accordance with the choice of the designer and as necessitated by the service for which the engine is to be used in each particular case.

The cylinder block 6 is provided with a laterally extending shelf or bracket 9 adjacent the upper end thereof, and the upper surface of which lies, preferably, in the plane of the upper end of the cylinder block, as best shown in Figure 2; and the open upper ends of the several cylinders are closed by means of a cylinder head 10, which head is detachably secured to the upper end of the cylinder block by means of bolts 11 extending through openings in the cylinder head and into threaded openings 12 in the upper end of the cylinder block; the particular manner in which the head is secured to the upper end of the cylinder block being, however, immaterial so far as concerns this present invention, and capable of variations within wide limits.

The head 10 is provided with a laterally extending housing portion to which the reference numeral 13 is applied and which extension or housing overlies and is supported by the bracket or shelf 9, as best shown in Figure 2, when the parts are assembled; and said head is provided with inlet and outlet passages through which combustible mixture flows into and exhaust gases flow from the several cylinders, one of said passages which may be either a supply or an exhaust passage being designated by the reference numeral 14; and suitable manifolds 15 and 16 communicate with said inlet and exhaust passages, all as is usual in internal combustion engine construction.

The laterally extending portion or housing 13 of the head 10 is open at both its upper and lower sides, as best shown in Figure 2, and the same is provided with a series of transversely extending webs or partitions 17 the number of which is shown as corresponding with the number of cylinders of the engine; altho the number of webs may be varied at pleasure as their principal function is to strengthen the head casting and to provide supports for a rod which in turn supports the valve operating levers as will hereinafter appear. The open upper end of the housing portion 13 is closed by a cover plate 18 extending throughout the length of the head, and the lower end of said housing contacts with suitable surfaces upon the upper side of the shelf or bracket 9, the said shelf or bracket being commonly formed integrally with and in effect a portion of the cylinder block 6, as will be appreciated.

The inlet and outlet passages in the head are controlled by suitable inlet and exhaust valves one of which is indicated by the reference numeral 19 in Figure 2, and which valves serve to control the ports through which said passages are placed in communication with the interior of the cylinder. These valves are provided each with a stem 20 which reciprocates within a bearing located within a suitable opening provided in the cylinder head, and said valves are closed each by a spring 21 in accordance with the usual practice in the case of engines equipped with poppet valves.

The valves 19 are operated by a series of oscillating valve operating levers 22, one associated with each valve, and which levers are located within the laterally extending portion or housing 13 of the head. These levers are all supported upon and by a shaft 23 which extends longitudinally of the head and which shaft is supported at suitable intervals along its length by bearings provided in the webs 17 two of which are indicated by the reference numeral 24. The number of such bearings or supports, however, as well as of the webs or partitions 17 is a matter of minor importance, so long as adequate support is provided for the shaft 23 and so long as the head structure itself is properly braced and strengthened by the webs referred to.

The upper ends of the rocking valve operating levers 22 extend into positions adjacent the upper ends of the valve stems 20 and are commonly provided each with an adjustable tappet 25; while the lower ends of said levers are provided with toes 26 which are acted upon by cams 27 carried by a rotating valve operating cam shaft 28 and which cams communicate oscillatory movement to the valve operating levers to thereby operate the valves, as will be appreciated. This valve operating shaft is supported in bearings 29 spaced along the length thereof and which bearings are shown as resting upon bridges 30 which are in effect portions of the upper surface of the laterally extending shelf or bracket 9, so that the said shelf or bracket serves also as a support for the valve operating shaft.

The webs or partitions 17 are cut away at their lower portions, as indicated in Figure 2, to an extent at least sufficient to clear the valve operating shaft 28, in order to thereby permit the head structure as a whole to be removed from the upper end of the cylinder block without removing the valve operating shaft along with it if and when the head is removed; and the laterally extending shelf or bracket 9 is preferably provided with depressions indicated by the reference numeral 31 which construction permits the valve operating shaft to be located closer to the plane of the upper end of the cylinder block and of the said bracket than would otherwise be the case, as the cams projecting from the said shaft come opposite these depressions when the parts are assembled and pass therethrough as the cam shaft rotates.

The valve operating shaft 28 may be operated from the crank shaft of the engine in any suitable way. In the embodiment of my invention illustrated, however, a suitable chain 32 is driven from the crank shaft and communicates motion to a counter shaft 33 which extends longitudinally of the engine, and which ordinarily serves to drive various auxiliary mechanisms thereof such, for example, as the magneto if used, the cooling liquid circulating pump, the starting generator, etc., altho these elements are not illustrated as they form no part of the invention to which this present application relates.

A second driving belt or chain 34 is driven by the shaft 33 and is connected with and serves to drive the valve operating shaft 28 through a suitable gear carried by said shaft; the ratio at which the valve operating shaft is driven from the crank shaft of the engine being the usual 2 to 1 ratio employed in valve operating mechanisms for internal combustion engines operating upon a four stroke cycle.

It will be appreciated, however, that the valve operating cam shaft 28 may be driven through the usual 2 to 1 train or spur gearing, through a similar train of bevel gearing or otherwise, so long as the valve operating shaft is operated from the crank shaft of the engine and in proper speed relation therewith.

The driving chain 34 extends through and is protected by a housing 36 shown as formed integrally with the cylinder block 6, while the gear upon the end of the valve operating shaft 28 operates within a housing 37 formed integrally with the head 10 and the lower end of which is secured to the housing 36 as by means of suitable cap screws 38. The driving chain 32 is enclosed and protected by a cover plate 39 secured to the end wall of the crank case of the engine and to a projecting portion 40 thereof by means of spaced cap screws 41, which projection is open at its upper end, and as best shown in Figure 5, and with which open end the open lower end of the housing 36 registers; the cover plate 39, the projection 40 and the housings 36 and 37 thus providing a closed chamber in which the two driving chains 32 and 34 operate.

Suitable dowel pins 42 are preferably provided at each end of the cylinder head and of the cylinder block, or at other places along the meeting surfaces between said members, the purpose of said dowel pins being to insure that the cylinder head after having been removed will, upon being reassembled with the cylinder block and secured thereto, resume its precise initial position; so that the cylinder head, the valves carried thereby, and the valve operating levers 22 which are permanently assembled with said head may be removed as a unitary structure, and replaced without disturbing the relationship of the valve operating levers to the valve operating cam shaft 28 whereby the said levers are operated. The end ones and, if deemed necessary, the intermediate bearings 29 which support the valve operating shaft 28 are also provided with dowels, as indicated at 43, which dowels act to position the said bearings and, as necessarily follows, to position the shaft 28 definitely relative to the upper surface of the cylinder block or rather to the bridges 30 of the shelf or bracket 9. It therefore follows that if after removing the head together with the valve mechanism which is permanently assembled therewith the valve shaft 28 is removed from the cylinder block the same will, upon being returned and reassembled with the block, resume its precise initial position relative to the cylinder block, or relative rather to the bracket 9 thereof which supports the said shaft, and, as necessarily follows, its proper position relative to the lower ends of the valve operating levers when the head is replaced upon the cylinder block.

It will also be appreciated that the tappets 25 at the free upper ends of the valve operating levers 22 are readily accessible by simply removing the cover plate 18, and that the valve mechanism may be inspected by the removal of the said plate, and adjusted to secure the proper amount of lost motion or back lash by simply removing the said cover plate.

A suitable quantity of lubricating oil will ordinarily be placed within the housing formed by the extension 13 of the head so that the valve operating shaft 28 and cams carried thereby will be thoroughly lubricated when the mechanism is in use. The lubricating material thus supplied may for the most part be contained within the depressions 31 in the shelf or bracket 9, in which case the cams will dip into the body of lubricant and form a splash lubrication system for the valve operating mechanism as a whole, or the interior of the extension or housing 13 may be more or less filled with the lubricant in which case the valve operating shaft and the cams thereupon will be submerged to a greater or less extent.

Having thus described and explained my invention, I claim and desire to secure by Letters Patent:

1. In an internal combustion engine of the class described, a cylinder block having a plurality of cylinders formed therein and the upper ends of which are open, and which block is provided with a laterally extending shelf or bracket adjacent its upper end; a rotatable valve operating shaft supported in bearings carried by said bracket and located above the upper ends of said cylinders; means for operating said shaft; a head secured to said cylinder block and closing the upper ends of said cylinders, and having a laterally extending housing open at its upper and lower ends and resting upon said bracket; a plurality of partitions provided in said housing; a shaft located within said housing and above the plane of the lower end thereof, and which shaft is supported in bearings provided in said partitions; a plurality of oscillating valve operating levers located within said housing and pivotally supported by and upon said shaft; a plurality of valves carried by said head and which valves are operated one by each of said valve operating levers; a plurality of cams carried by said valve operating shaft and which cams co-operate one with each of said valve operating levers; and a removable cover for closing the upper end of said housing.

2. In an internal combustion engine, a cylinder open at its upper end; a hollow head for closing the open upper end of said cylinder; a valve carried by said head for controlling a port therein; a rocking lever supported within said head for operating said valve; and a cam shaft supported by said cylinder above the upper end thereof and having a cam adapted to engage and operate said lever.

3. In an internal combustion engine of the class described, a cylinder open at its upper end and having a laterally extending shelf or bracket adjacent said upper end; a rotatable valve operating shaft supported in bearings carried by said bracket and located above the plane of the upper end of said cylinder; means for operating said shaft; a head secured to said cylinder and closing the open upper end thereof and having a laterally extending housing resting upon said bracket; a reciprocating valve adapted to control a port leading into said cylinder; and an oscillating valve operating lever pivotally supported within said housing above the plane of the upper end of said cylinder and operated by a cam upon said valve operating shaft, and which lever is adapted to operate said valve.

4. In an internal combustion engine of the class described, a cylinder open at its upper end and having a shelf or bracket adjacent said upper end; a rotatable valve operating shaft supported by said bracket and located above the plane of the upper end of said cylinder; means for operating said shaft; a head secured to said cylinder and closing the upper end thereof, and having a hollow housing portion which co-operates with said bracket to form a closed chamber within which said valve operating shaft is located; a valve carried by said head and adapted to control a port leading into said cylinder; and an oscillating valve operating the lever pivotally supported within said housing above the plane of the upper end of said cyinder and operated by a cam upon said valve operating shaft, and which lever is adapted to operate said valve.

5. In an internal combustion engine of the class described, a cylinder block open at its upper end; a head for closing the upper end of said block and having a plurality of passages through which combustible mixture may flow thereinto, and exhaust gases therefrom; valves carried by said head and adapted to control the flow through said passages; valve operating mechanism carried by said head and adapted to operate said valves; a hollow housing formed integrally with said cylinder block and located at one end thereof; a rotatable valve operating shaft adapted to operate said valve operating mechanism; a hollow housing formed integrally with said head and located at one end thereof, and adapted to register with the housing aforesaid of said cylinder block; and operating means located within the two housings aforesaid and through which said valve operating shaft is driven from the crank shaft of the engine.

In testimony whereof I affix my signature.

VICTOR C. PARKER.